United States Patent Office 3,574,149
Patented Apr. 6, 1971

3,574,149
FLAME RETARDANT FLEXIBLE
POLYURETHANE FOAMS
John T. Harrington, Akron, Ohio, assignor to The General
Tire & Rubber Company, Akron, Ohio
No Drawing. Filed May 13, 1969, Ser. No. 824,285
Int. Cl. C08g 22/44
U.S. Cl. 260—2.5                7 Claims

ABSTRACT OF THE DISCLOSURE

Low density, flexible and semiflexible polyetherurethane foams containing halogen-containing polymers such as polyvinyl chloride are rendered resistant to flame to the point of being self-extinguishing by the use of a minor amount of a mixture of zinc oxide (French process) and antimony oxide.

BACKGROUND OF THE INVENTION

Flexible and semiflexible polyurethane foams have found widespread utility in the fields of insulation, structural reinforcement, cushioning and electrical encapsulation. One factor limiting the commercial utilization of such foams has been their flammability when exposed to flame or high temperatures. The use of a combination of antimony oxide and finely-divided vinyl halide resin is specifically shown in U.S. Patent No. 3,075,928. Unfortunately, none of the various additives or additive combinations shown in the art has been uniformly effective, especially in low density, flexible and semiflexible polyetherurethane foams, in producing optimum flame resistance.

Accordingly, it is the primary object of this invention to provide flexible and semiflexible, low density polyetherurethane foams which contain halogen-containing polymers and which have the property of flame-resistance even to the point of being self-extinguishing. It is a further object to produce such foams by the use of a simple but novel combination of additives.

These and other objects and advantages of the present invention will become more apparent to those skilled in the art from the following detailed description and examples.

SUMMARY OF THE INVENTION

According to the present invention it has now been discovered that flexible and semiflexible polyetherurethane foams are rendered not only flame-resistant but also self-extinguishing by incorporating into the foam composition, prior to the blowing thereof into a foam, a mixture of zinc oxide (French Process) and antimony trioxide together with a finely-divided halogen-containing solid polymer.

DESCRIPTION OF THE PREFERRED EMBODIMENTS

The polyurethane foaming composition or formulation must contain per 100 parts by weight of the organic polyol from about 0.5 to 15 parts, preferably about 1 to 10 parts, of zinc oxide (French process) and from about 1 to 20 parts, preferably about 3 to 15 parts, of antimony oxide.

The halogen-containing solid polymers employed herein include polymers, usually resinous in character, of vinyl chloride, vinyl bromide, vinyl fluoride and vinylidene chloride and mixtures of these monomers as well as copolymers of a predominating molar amount of one or more of these monomers and a minor amount of vinyl acetate, acrylonitrile, methacrylonitrile, dimethyl or diethyl maleate or fumarate, methyl acrylate, methyl methacrylate, ethyl ethacrylate, vinyl stearate and the like and mixtures thereof. Still other halogen-containing resins can be used such as hydrolyzed or partially hydrolyzed copolymers of a major amount of the vinyl halide and a minor amount of vinyl acetate. Moreover, other resinous polymers can be used such as chlorinated rubber, chlorinated polyethylene, chlorinated polyvinyl chloride, polytetrafluoroethylene and the like. Mixtures of the halogen-containing polymeric resins can be used.

These halogen-containing resins should be finely divided (powder from about 0.0001 to 2 mm.) and have an intrinsic viscosity of from about 0.25 to 2.5, preferably from about 0.5 to 1.5. The halogen-containing resinous polymers are generally used in an amount of from about 2 to 100 parts by weight per 100 parts by weight of the polyol to obtain the desired load bearing characteristics, but in many instances there need be only about 5 to 40 parts, preferably from about 15 to 30 parts by weight. The halogen-containing polymers can be made by bulk, solvent, emulsion or suspension polymerization processes. It is preferred to use halogen-containing polymers made by the emulsion polymerization process. Of these halogen-containing resins it also is preferred to employ polyvinyl chloride, especially emulsion polymerized polyvinyl chloride (plastisol grade).

Polyols used in making the polyurethanes of the present invention are primary and secondary hydroxy-terminated polyoxyalkylene ethers having from 2 to 4 hydroxyl groups and a molecular weight of from about 1,000 to 10,000. They are liquids or are capable of being liquefied or melted for handling in the polyurethane foaming apparatus or machine.

Examples of polyoxyalkylene polyols include linear and branched polyethers having a plurality of ether linkages and containing at least two hydroxyl groups and being substantially free from functional groups other than hydroxyl. Among the polyoxyalkylene polyols which are useful in the practice of this invention are the polyethylene glycols, the polypropylene glycols, and polybutylene ether glycols. Polymers and copolymers of polyoxyalkylene polyols are also adaptable in the process of this invention as well as the block copolymers of ethylene oxide and propylene oxide. Among the copolymers of polyoxyalkylene polyols that deserve some special mention are the ethylene oxide, propylene oxide and butylene oxide adducts of ethylene glycol, propylene glycol, diethylene glycol, dipropylene glycol, triethylene glycol, 2-ethylhexanediol-1,3,glycerol, 1,2,6-hexanetriol, trimethylolpropane, trimethylolethane, tris(hydroxyphenyl) propane, triethanolamine, triisopropanolamine, ethylenediamine, and ethanolamine. Linear and branched copolyethers of ethylene oxide and propylene oxide are also useful in making the foamed products of this invention with the preferred ones being those end-blocked with ethylene oxide to provide primary hydroxyl groups in the polymer and having molecular weights of from about 2000 to 5000.

Further useful types of polyetherpolyols are block copolymers prepared from propylene oxide and ethylene oxide. These polyethers can be characterized by reference to the following general formulae:

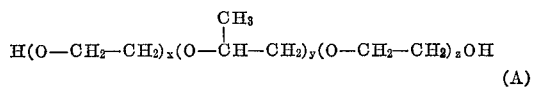

(A)

and

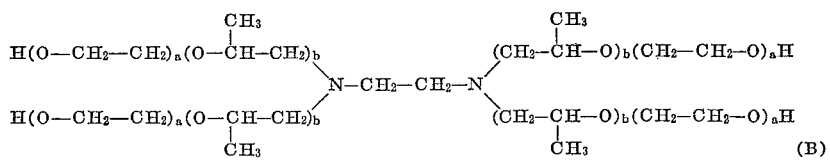

(B)

wherein Formula A the total of subscripts, $x$, $y$, and $z$ represent positive integers in the range of from 20 to 70 and the total of subscripts $a$ and $b$ of Formula B represent positive integers in the range of from 20 to 100.

Polyethers having a branched chain network are also useful. Such branched chain polyethers are readily prepared from alkylene oxides of the type above described and initiators having a functionality greater than two. Branched polyethers have the advantage of making possible cross linking without the interaction of urea or urethane groups with the isocyanate groups. This has the advantage of making a larger proportion of the isocyanate used available for the evolution of carbon dioxide and the reducing of the overall amount of isocyanate that is required in the preparation of the foamed polymer. Mixtures of polyether polyols can be used.

Likewise, there can be used as polyols grafts of ethylenically unsaturated monomers such as acrylonitrile, methacrylonitrile, vinyl acetate, methyl acrylate and the like on the polyols and having the functionality and molecular weight as shown above. Such graft polyols and methods for making the same are shown in the U.S. Patents to Stamberger, Nos. 3,304,273 and 3,383,351 and in the U.S. Patent to Von Bonin, No. 3,294,711.

When desired, cross-linking materials having from 2 to 8 hydroxyl groups can be included in the foam formulation to increase cross link density and so forth. They have molecular weights of from about 60 to 600. Only small amounts of such materials are generally needed (about 0.3 to 10 mols per 100 mols of polyol). Examples of such crosslinking agents are glycol, diethylene glycol, propylene glycol, butane diol-1,4, dipropylene glycol, glycerol, trimethylolpropane, butane triols, hexanetriols, trimethylolphenol, tris(hydroxyphenyl)propane, tris(hydroxyxylyl)propane, various tetrols, such as erythritol and pentaerythritol, pentols, hexols, such as dipentaerythritol and sorbitol, as well as alkyl glucosides, carbohydrates, polyhydroxy fatty acid esters such as castor oil, and polyoxy alkylated derivates of poly-functional compounds having three or more reactive hydrogen atoms, such as, for example, the reaction product of trimethylolpropane, glycerol, 1,2,6-hexanetriol, sorbitol and other polyols with ethylene oxide, propylene oxide or other alkylene epoxides or copolymers thereof, e.g., copolymers of ethylene and propylene oxides. Grafted crosslinkers can be prepared by the process of the aforementioned Stamberger and Van Bonin U.S. Patents. Mixtures of crosslinkers can be used. All the polmyer-forming ingredients should preferably be free of any amine function which is not sterically hindered or shielded.

Any organic di- or tri-isocyanate can be used in the practice of the present invention. Diisocyanates are preferred, particularly when there is any considerable amount of branching in the polyol or crosslinker to avoid the formation of rigid or semi-rigid foams and vice versa. Examples of suitable organic polyisocyanates to use are ethylene diisocyante, trimethylene diisocyanate, tetramethylene diisocyanate, pentamethylene diisocyanate, hexamethylene diisocyanate, propylene-1,2-diisocyanate, butylene-1,2-diisocyanate, butylene-1,3-diisocyanate, butylene-2,3-diisocyanate, alkylidene diisocyanates such as ethylidine diisocyanate and butylidine diisocyanate; cycloalkylene diisocyanates such as cyclopentylene-1,3-diisocyanate, cyclohexylene-1,2-diisocyanate, cyclohexylene-1,3-diisocyanate, and cyclohexylene-1,4-diisocyanate; cycloalkylidene diisocyanats such as cyclopentylidene diisocyanate and cyclohexylidene diisocyanate; aromatic diisocyanates such as m-phenylene diisocyanate, p-phenylene diisocyanate, polymethylene polyphenylisocyanate, 2,4-tolylene diisocyanate, 2,6-tolylene diisocyanate, bitolylene diisocyanate, naphthalene-1,4-diisocyanate, and diphenylene-4,4'-diisocyanate; aliphatic-aromatic diisocyanates such as xylylene-1,4-diisocyanate, xylylene-1,3-diisocyanate, bis (4-isocyanatophenyl) methane, bis(3-methyl-4-isocyanatophenyl)methane, and 4,4'-diphenylpropane diisocyanate, durylene diisocyanate, 4,4',4''-tris(isocyanatophenyl) methane, 3,10-diisocyanatotricyclo[5.2.1.0$^{2,6}$] decane, bis-(2-isocyanatoethylcarbonate, and naphthalene triisocyanate and the like. Mixtures of polyisocyanates can be used.

The amount of polyisocyanate employed ranges from about 0.70 to 1.35 total mols of NCO (in the polyisocyanates) per total mol of active hydrogen (as determined by the Zerewitinoff method, J.A.C.S., vol. 49, p. 3181 (1927)) in the polyols, crosslinkers, water, halogen-containing resins (such as partially hydrolyzed vinyl chloride-vinyl acetate copolymers) and any other active hydrogen-containing materal in the polyurethane foam formulation.

Water is used as a blowing agent and is employed in amounts of from about 1.5 to 5 parts by weight per 100 parts by weight of the polyol.

The water should be substantially or essentially pure, that is, it should be free of impurities such as ions, sols, etc. of mineral, vegetable or synthetic origin and the like which would adversely affect the foaming action or the properties of the resultant polyurethane foam. Deionized, distilled or otherwise purified water should be employed.

If lower density and softer foams are desired there additionally can be added to the polyurethane foam formulation separately or in admixture with one of the other components, i.e., polyol or polyisocyanate, etc., up to about 25 parts by weight of a fluorocarbon blowing agent per 100 parts by weight of the polyol. Examples of such blowing agents are those fluorine substituted aliphatic hydrocarbons which have boiling points between about −40 C°. and +170° C., and which vaporize at or below the temperature of the foaming mass. The blowing agents include, for example, trichloromonofluoromethane, dichlorodifluoromethane, dichloromonofluoromethane, bromotrifluoromethane, chlorodifluoromethane, 1,1-dichloro-1-fluoroethane, 1,1-difluoro-1,2,2-trichloroethane, chloropentafluoroethane, 1 - chloro - 1-fluoroethane, 1-chloro-2-fluoroethane, 1,1,2 - trichloro-1,2,2-trifluoroethane, 1,1,1-trichloro - 2,2,2 - trifluoroethane, 2-chloro-nona-fluorobutane, hexafluorocyclobutene, and octafluorocyclobutane. Still other easily vaporizable fluorocarbons can be used. Mixtures of the fluorocarbons can be used. Still other blowing agents can be used in full or partial replacement of the fluorocarbons such as propane, butane, pentane, pentene, hexane and so forth, and mixtures thereof, particularly where precautions are taken to prevent explosions or where removal of the gasses is provided. See U.S. Patents Nos. 3,072,582 and 3,391,093.

Catalysts for the polyetherpolyol-polyisocyanate reaction can be any catalyst heretofore used in the art particularly the metal-containing catalysts. Examples of such catalysts are (1) tertiary phosphines such as trialkylphosphines, dialkyl-benzylphosphines, and the like; (2) strong bases such as the alkali and alkaline earth metal hydroxides, alkoxides, and phenoxides; (3) acidic metal salts of strong acids such as ferric chloride, stannic chloride, stannous chloride, antimony trichloride, bismuth nitrate, bismuth chloride, and the like; (4) chelates of various metals such as those which can be obtained from acetylacetone, benzoylacetone, trifluoroacetylacetone, ethyl acetoacetate, salicylaldehyde, cyclopentanone-2-carboxylate, and the like, with various metals such as Be, Mg, Zn, Cd, Pb, Ti, Zr, Sn, As, Bi, Cr, Mo, Mn, Fe, Co, Ni, or ions such as $MoO_2^{++}$ and the like; (5) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones and 2-(N,N-dialkylamino) alkanols, such as the well known chelates of titanium obtained by said or equivalent procedures; (6) salts of organic acids with metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese, cobalt, lead naphthenate and the like; (7) organometallic derivatives of tetravalent tin, trivalent and pentavalent As, Sb, and Bi, and metal carbonyls of iron and cobalt; and (8) the dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin - bis(6 - methylaminocaproate), and the like; as well as a trialkyltin hydroxide, dialkyltin oxide, dialkyltin dialkoxide, or a dialkyltin dichloride, such as trimethyltin hydroxide, tributyltin hydroxide, trioctyltin hydroxide, dibutyltin oxide, dioctyltin oxide, dilauryltin oxide, dibutyltin-bis(isopropoxide), dibutyltin - bis(2 - methylaminopentylate), dibutyltin dichloride, dioctyltin dichloride, and the like and mixtures thereof. Preferred catalysts to use are the divalent tin salts of carboxylic acids having from 2 to 18 carbon atoms. These catalyst are used in an amount of from about 0.1 to 0.9 part by weight per 100 parts by weight of the polyetherpolyol. It is less preferable to use these catalysts, such as the metal salts, alcoholates, hydroxides, alkoxides and phosphines, epecially in large amounts, where resins containing ester groups in a substantial amount are used since they tend to hydrolyze the ester linkages thereby causing scission of the backbone polymer chain and lowering of the physical and chemical properties of the resultant foams and so forth, especially under conditions of high temperature and humidity.

Surfactants or emulsifiers are necessary to provide the desired cell formation and growth. Polysiloxane-polyoxyalkylene block copolymers are preferred. Polysiloxane-polyoxyalkylene block copolymers are described in U.S. Pats. 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-subtstituted monovalent hydrocarbon group and (b) an alkali metal salt of a polyoxyalkylene polymer to a temperature sufficient to cause the polysiloxane polymer and the salt to react to form the block copolymer. Although the use of an emulsifier is desirable to influence the type of foam structure that is formed, the foam products of the invention can be prepared without emulsifiers. Still other polysiloxane-polyoxyalkylene copolymers known to the art may be employed as well as silicones, turkey red oil and so forth. The surfactant is used in an amount of from about 0.3 to 2.5 parts by weight per 100 parts by weight of the polyether polyol.

It is highly advantageous to incorporate into the urethane compositions of the present invention at least one organic tertiary amine catalyst, preferably together with a metal-containing co-catalyst. The amount of organic amine catalyst may comprise, per 100 parts by weight of organic polyol, about 0.05 to 3.2 parts by weight. In the case of the polyether polyols where a metal catalyst is used for the urethane-forming reaction, it is preferred to use only from about 0.05 to 0.9 part by weight of the amine. On the other hand, where the tertiary amine is taking care of both the foaming ($H_2O+NCO$) and network (—ROH+NCO) reactions, the tertiary amines should be used in an amount of from about 0.9 to 3.2 parts by weight based on 100 parts by weight of the polypolyol.

In the urethane compositions of the invention there may be used a wide variety of organic tertiary amine catalysts. Such organic amines, include, among others, tri-ethylene diamine, triphenyl amine, triethylamine, N,N,N',N'-tetramethyl-1,3-butane diamine, N-methyl morpholine, N-ethyl morpholine, N-acetyl morpholine, N-octyl morpholine, N-coco morpholine, N-phenyl morpholine, N-hydroxyl ethyl morpholine, N-hydroxyl methyl morpholine, 4,4'-dithiodimorpholine, dimethyl piperazine, N,N,N',N'-tetramethyl propane diamine, trimethyl aminoethyl piperazine, N,N-dimethyl ethanolamine, dimethyl hexadecylamine, 1-(2-ethyl-1-hexenyl) piperazine, tri-n-octylamine, trimethylamine, N,N-dimethyl benzyl amine, triethanolamine, 1,2,4-trimethylpiperazine, N-methyl dicyclohexylamine, and mixtures thereof. Preferred are the sterically hindered organic tertiary amines, especially those disclosed in copending U.S. patent application of Edwin M. Maxey and John T. Harrington, entitled "Urethane Foams Containing Halogen Containing Polymers And Methods For Preparing The Same Using Certain Catalysts," filed Apr. 24, 1969, Ser. No. 819,087 (GT–508).

Other well known constituents can be added to the polyurethane foam recipe such as barium and cadmium salts of carboxylic acids, clay, talc, $TiO_2$, silica and hydrated silica, $CaCO_3$, metal chromates, barytes, phthalocyanine green or blue pigments, red iron oxide, conventional stabilizers, carbon black, dyes, toners, epoxidized soy bean oil (Paraplex G–62), epoxides (Epon 828), tricresyl phosphate, antioxidants, fungicides, bacteriostats and the like. These constituents can be added in various amounts to the foaming ingredients to achieve the desired properties in the resultant flexible, low density foams.

The flexible, cellular urethane-vinyl chloride polymeric foams of the present invention can be used as cushions, mattresses, pillows, cushioning material for furniture and automobiles, rug underlay and especially as interior automobile door panels, head rests, and so forth.

The preparation of the polyurethane foams of the present invention can be formed by a process known in the art as the "one-shot" process or by a two step process involving, first, the preparation of a "prepolymer," the well known "semiprepolymer" or "quasi-prepolymer" technique. There all or a portion of the polyol is reacted with all of the organic polyisocyanate, providing a reaction product which contains a high percentage free isocyanate groups and which is reacted with the remaining portion of the hydroxyl-terminated polyol or a cross-linker, together with water, catalysts, metal oxides and the halogen-containing polymer to form a rubbery, cellular, elastic product.

No matter which particular technique is used, the halogen-containing polymer or resin may not only be dispersed with the polyol alone, but alternatively with the organic polyisocyanate alone. Still another method within the purview of the present invention involves dispersing the halogen-containing polymer with a combination of the polyol and the organic polyisocyanate. In any case, it is advantageous to disperse the halogen-containing polymer thoroughly into whatever particular initial composition is used.

The following examples are intended to illustrate more fully but not to limit the invention, which is properly delineated in the claims.

EXAMPLE I

To each of two separate batches of 100 grams of polyoxypropylene triol having an average molecular weight of about 3000 (Poly G 3030PG) were added with stirring 1.0 gram of a surfactant comprising a block copolymer of dimethyl siloxane and alkylene oxide (Union Carbide L540), 0.15 gram of the tertiary amine blowing catalyst bis-(2-dimethylaminoethyl) ether (70% by weight in dipropylene glycol) 0.4 gram of stannous octoate and 4.0 grams of deionized water. The above materials were stirred until uniform dispersions were obtained. To each of the above dispersions was added 22 grams of a finely divided polyvinyl chloride resin produced by emulsion polymerization and having an intrinsic viscosity of 1.28 (GEON–121). To one dispersion was added a combination of 7 grams of finely divided antimony trioxide and 3 grams of finely divided zinc oxide. To the other dispersion was added 14 grams of antimony oxide. Additional stirring was performed until uniform dispersions were obtained.

To each of the above dispersions was added 52 grams of an 80:20 blend of the 2,4 and 2,6 isomers of toluene diisocyanate with additional rapid stirring for 10 seconds. The resulting admixtures were poured into gallon containers and allowed 3 minutes for the resulting foaming reactions to take place. After this the foams were placed in an oven regulated to a temperature of 250° F. and cured at this temperature for 10 minutes to produce rubbery, resilient, load resistant cellular products.

The foams were then removed from the oven and cut into test specimens for flammability testing in accordance with ASTM–D–1692–59T. In the foregoing ASTM test a Bunsen burner flame having a blue cone of 1.5 inches in height is applied separately to the front edge of the foam test specimens (6 inches by 2 inches by 0.5 inch) and allowed to remain in contact therewith for a period of sixty seconds or until the one inch bench mark is reached. The "self-extinguishing time" is measured in seconds, and the "distance burned" is considered the furthermost point reached by the flame. The foam recipes and test results are shown below.

| Materials | Foam A, grams | Foam B, grams |
|---|---|---|
| 3,000 M.W. polyoxypropylene triol | 100 | 100 |
| Surfactant | 1.0 | 1.0 |
| Amine blowing catalyst | 0.15 | 0.15 |
| Stannous octoate | 0.40 | 0.40 |
| Deionized water | 4.0 | 4.0 |
| Toluene diisocyanate, 80:20 | 52 | 52 |
| Polyvinyl chloride resin | 22 | 22 |
| Antimony trioxide | 7 | 14 |
| Zinc oxide, French process | 3 | 0 |

ASTM–D–1692–59T RESULTS

| Foam | Self extinguishing time, seconds | Distance burned, inches |
|---|---|---|
| A | 25.0 | 1.60 |
| B | 70.0 | 2.40 |

The above data show that the synergistic combination of this invention as employed in Foam A is superior as to self extinguishing time and distance burned in urethane foams compared to a similar combination of the prior art as employed in Foam B containing no zinc oxide.

EXAMPLE II

Separate foams were prepared using the same procedure as in Example I employing the same amounts of the polyoxypropylene triol, the silicone surfactant, the amine blowing catalyst, the stannous octoate, the deionized water, the 80:20 toluene diisocyanate and also the following amounts in grams of the components listed below:

| | Foam | | | | |
|---|---|---|---|---|---|
| | C | D | E | F | G |
| The polyvinyl chloride resin of Example I | 22 | 22 | 22 | 22 | 27 |
| Antimony trioxide | 7 | 7 | 7 | 7 | 7 |
| $Cr_3O_2$ | 7 | | | | |
| CdO | | 7 | | | |
| $PbO_2$ | | | 7 | | |
| ZnO, French process | | | | 7 | |
| $TiO_2$ | | | | | 7 |

The resulting foams were then tested in accordance with ASTM–D–1692–59T:

| Foam | Self extinguishing time, seconds | Distance burned, inches |
|---|---|---|
| C | 104 | 3.4 |
| D | 168 | 3.3 |
| E | 135 | 3.2 |
| F | 21 | 1.8 |
| G | 125 | 3.0 |

The above data show that the combination of a vinyl chloride polymer, antimony trioxide and zinc oxide as employed in Foam F is truly synergistic for the purpose of the invention of producing optimum self-extinguishing urethane foams. The other four metal oxides were found to be substantially less effective for the purposes of the present invention when blended with the same antimony trioxide and the same vinyl chloride polymer.

Example III

A foam was prepared using the same general procedure as in Example I and employing the same amounts of the silicone surfactant, the stannous octoate, the amine blowing catalyst, the polyvinyl chloride resin, the antimony trioxide and the French process zinc oxide of Example I but using 3.2 grams of the deionized water, 40 grams of the 80:20 toluene diisocyanate and 100 grams of a different organic polyol comprising a polyether diol having a molecular weight of 2,300 (Dow 2301).

The resulting foam was tested in accordance with ASTM–D–1692–59T.

| Foam | Self extinguishing time, seconds | Distance burned, inches |
|---|---|---|
| H | 33 | 1.70 |

This example shows that the use of a different organic polyol does not significantly affect the benefits of the invention.

EXAMPLE IV

A masterbatch was prepared by mixing the following materials in the amounts shown:

Materials: Grams
 The polyol of Example I _____ 150
 A solid suspension-polymerized polyvinyl chloride resin of 40 microns particle size (VYGEN–123) _____ 33
 Antimony trioxide _____ 10.5
 Zinc oxide (French process) _____ 4.5

The resulting masterbatch was mixed in a Waring Blendor for 15 minutes. Then 132 grams of the foregoing masterbatch was mixed in a foam formulation according to the following recipe and foamed and cured in accordance with the procedure of Example I.

Materials: Grams
  Masterbatch _____ 132
  The silicone surfactant of Example I _____ 1
  Stannous octoate _____ 0.3
  The tertiary amine blowing catalyst of Example I _____ 0.15
  Deionized water _____ 4.0
  Toluene diisocyanate (80:20) _____ 52

The resulting foam was tested in accordance with ASTM-D-1692-59T:

| Foam | Self extinguishing time, seconds | Distance burned, inches |
|---|---|---|
| J | 18.0 | 1.5 |

This example shows that variations in the halogen-containing polymer, the mixing procedure and the amounts of ingredients within the described parameters does not significantly change the expected benefits of this invention.

EXAMPLE V

A foam was prepared using the same general procedure as in Example I with 100 grams of the same 3,000 M.W. polyoxypropylene triol, 0.12 gram of the amine blowing catalyst, 0.40 gram of the stannous octoate, 1.0 gram of the silicone surfactant, 3.5 grams of $CCl_3F$, 4.24 grams of deionized water, 57 grams of toluene diisocyanate (80:20), 15 grams of the polyvinyl chloride resin, 7.0 grams of antimony trioxide and 3.0 grams of the French process zinc oxide.

The resulting foam was tested in accordance with ASTM-D-1692-59T:

| Foam | Self extinguishing time, seconds | Distance burned, inches |
|---|---|---|
| K | 12.0 | 1.50 |

The above data show that for the purposes of this invention a fluorocarbon blowing agent may be used in conjunction with the formulations of this invention without being detrimental to the expected benefits.

EXAMPLE VI

There was pre-blended in a Waring Blendor for 15 minutes a masterbatch of 100 grams of the polyoxypropylene triol, 15 grams of the polyvinyl chloride resin, 7 grams of the antimony oxide and 3 grams of the zinc oxide employed in Example I.

To this masterbatch was added, with stirring, 0.3 gram of the stannous octoate, 0.15 gram of the amine blowing catalyst bis-(2-dimethylaminoethyl)ether, 4.0 grams of deionized water, and 52 grams of the toluene diisocyanate (80:20) employed in Example I. This formulation was formed and cured in accordance with the procedure of Example I and tested in accordance with ASTM-D-1692-59T:

| Foam | Self extinguishing time, seconds | Distance burned, inches |
|---|---|---|
| L | 9.0 | 1.20 |

EXAMPLE VII

Each of several separate masterbatches prepared as described in Example VI was mixed with 0.15 gram of the amine catalyst of Example I and the indicated amounts of the following ingredients, and the resulting formulations were foamed and cured in accordance with the procedure of Example I.

| Materials | Foam M (Grams) | Foam N (Grams) | Foam P (Grams) |
|---|---|---|---|
| Stannous octoate | 0.60 | 0.40 | 0.35 |
| The silicone surfactant of Example I | 1.9 | 1.5 | 1.5 |
| Deionized water | 4.17 | 4.46 | 4.24 |
| $CCl_3F$ | 18.00 | 5.25 | 3.50 |
| Toluene diisocyanate, 80:20 | 52.0 | 54.3 | 57.0 |

The resulting foams were tested in accordance with ASTM-D-1692-59T:

| Foam | Self extinguishing time, seconds | Distance burned, inch |
|---|---|---|
| M | 18 | 1.7 |
| N | 20 | 1.8 |
| P | 19 | 1.6 |

EXAMPLE VIII

Flexible polyetherurethane foams were made using the materials shown below and tested for flame resistance following the methods of the previous examples:

| Materials | Q | R | S | T | U | V | W |
|---|---|---|---|---|---|---|---|
| Polyoxypropylene triol, (poly G 3030P G) | 100 | 100 | 100 | 100 | 100 | 100 | 100 |
| Stannous octoate | 0.3 | 0.3 | 0.3 | 0.3 | 0.3 | 0.3 | 0.3 |
| Silicone block copolymer, L540 | 1 | 1 | 1 | 1 | 1 | 1 | 1 |
| Amine, same as Example I | .15 | .15 | .15 | .15 | .15 | .15 | .15 |
| Water, deionized | 4 | 4 | 4 | 4 | 4 | 4 | 4 |
| Toluene diisocyanate, 80:20; 2,4-/2,6- | 52 | 52 | 52 | 52 | 52 | 52 | 52 |
| Finely divided polyvinyl chloride, Geon 121 | 22 | 22 | 22 | 22 | 22 | 22 | 22 |
| Finely divided $Sb_2O_3$ | 7 | 7 | 7 | 7 | 7 | 7 | 7 |
| Finely divided ZnO [1] | 3 | | | | | | |
| Finely divided ZnO [2] | | 3 | | | | | |
| Finely divided ZnO [3] | | | 3 | | | | |
| Finely divided ZnO [4] | | | | 3 | | | |
| Finely divided ZnO [5] | | | | | 3 | | |
| Finely divided ZnO [6] | | | | | | 3 | |
| Finely divided ZnO [7] | | | | | | | 3 |

[1] American process zinc oxide, average particle size 1.5 microns.
[2] American process zinc oxide, average particle size 0.27 micron.
[3] American process zinc oxide, average particle size 0.27 micron, surface treated with propionic acid to increase dispersability.
[4] American process zinc oxide, average particle size 0.27 micron.
[5] French process zinc oxide, average particle size 0.11 micron, surface treated with propionic acid to increase dispersability.
[6] French process zinc oxide, average particle size 0.3 micron.
[7] French process zinc oxide, average particle size 0.11 micron.

Flammability tests on two samples of each foam run gave the following results:

| Runs: | Self extinguishing time | Distance burned, inches |
|---|---|---|
| Q | 137 seconds | 3.6 |
|   | Burns—169 seconds | 5 |
| R | Burns—150 seconds | 5 |
|   | Burns—129 seconds | 5 |
| S | 109 seconds | 3.3 |
|   | Burns—112 seconds | 5 |
| T | Burns—138 seconds | 5 |
|   | Burns—116 seconds | 5 |
| U | 44 seconds | 2.3 |
|   | 63 seconds | 3.3 |
| V | 89 seconds | 3.4 |
|   | 105 seconds | 3.0 |
| W | 74 seconds | 3.2 |
|   | 19 seconds | 1.7 |

This example shows the unexpected results obtained using French process zinc oxide as compared to American process zinc oxide. In contrast similar foams prepared in the same fashion but which omitted antimony oxide were not self extinguishing.

The embodiments of the invention in which an exclusive property or privilege is claimed are defined as follows:

1. A low density, flexible or semiflexible polyetherurethane foam, the ether moieties of said foam being derived from polyols having a molecular weight of from about 1,000 to 10,000 and from 2 to 4 hydroxyl groups, said foam containing (I) from about 2 to 100 parts by weight per 100 parts by weight of the polyol of a finely divided, solid halogen-containing polymeric resin having an intrinsic viscosity of from about 0.25 to 2.5, French Process zinc oxide in an amount of from about 0.5 to 15 parts by weight per 100 parts by weight of the polyol, and (III) antimony trioxide in an amount of from about 1 to 20 parts by weight per 100 parts of the polyol.

2. A foam according to claim 1 in which the polyol is a polyalkylene ether polyol and the catalyst includes a tertiary amine present in an amount of from about 0.05 to 0.9 part by weight per 100 parts by weight of said polyol and a metal-containing polyurethane catalyst present in an amount from about 0.1 to 0.9 part by weight per 100 parts by weight of said polyol.

3. A foam according to claim 2 in which the resin (I) is selected from the group consisting of polyvinyl chloride, a copolymer of a major amount of vinyl chloride and a minor amount of vinyl acetate, a partially hydrolyzed copolymer of a major amount of vinyl chloride and a minor amount of vinyl acetate, and chlorinated polyethylene and in which said resin is present in an amount of from about 5 to 40 parts by weight per 100 parts by weight of the polyol, the zinc oxide (II) is present in an amount of from about 1 to 10 parts by weight per 100 parts of the polyol, and the antimony trioxide (III) is used in an amount of from about 3 to 15 parts by weight per 100 parts of the polyol, the amount of zinc oxide being essentially no more than the amount of antimony trioxide.

4. A foam according to claim 3 in which the resin (I) is polyvinyl chloride made by emulsion polymerization.

5. A foam according to claim 4 in which the metal-containing catalyst is stannous octoate.

6. A foam according to claim 3 in which the resin (I) is a copolymer of a major amount of vinyl chloride and a minor amount of vinyl acetate and the metal-containing catalyst is stannous octoate.

7. A foam according to claim 6 in which the resin copolymer has been partially hydrolyzed.

References Cited

UNITED STATES PATENTS

| | | | |
|---|---|---|---|
| 2,475,626 | 7/1949 | Leatherman | 260—29.1 |
| 3,075,927 | 1/1963 | Lanham | 260—2.5 |
| 3,075,928 | 1/1963 | Lanham | 260—2.5 |
| 3,222,305 | 12/1965 | Lanham | 260—2.5 |

FOREIGN PATENTS

| | | |
|---|---|---|
| 241,361 | 11/1962 | Australia. |
| 661,544 | 11/1951 | Great Britain. |
| 674,782 | 11/1963 | Canada. |
| 777,384 | 6/1957 | Great Britain. |
| 1,012,653 | 12/1965 | Great Britain. |
| 1,415,448 | 9/1965 | France. |

OTHER REFERENCES

Japanese patent specification No. 39–3997 (1964).

Zinc Oxide Rediscovered, prepared by Harvey E. Brown, Market Development Division of The New Jersey Zinc Company, pp. 11–12, Call Number TP 245.Z7N4 (1957).

DONALD E. CZAJA, Primary Examiner

E. C. RZUCIDLO, Assistant Examiner

U.S. Cl. X.R.

260—45.75